United States Patent
Lin et al.

(10) Patent No.: US 11,884,381 B2
(45) Date of Patent: Jan. 30, 2024

(54) HIGH EFFICIENCY LOW POWER (HELP) ACTIVE FLOW CONTROL METHODOLOGY FOR SIMPLE-HINGED FLAP HIGH-LIFT SYSTEMS

(71) Applicant: UNITED STATES OF AMERICA AS REPRESENTED BY THE ADMINISTRATOR OF NASA, Washington, DC (US)

(72) Inventors: John C. Lin, Seaford, VA (US); Latunia P. Melton, Yorktown, VA (US); Mehti Koklu, Hampton, VA (US); Marlyn Y. Andino, Newport News, VA (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 84 days.

(21) Appl. No.: 17/238,443

(22) Filed: Apr. 23, 2021

(65) Prior Publication Data
US 2021/0331784 A1  Oct. 28, 2021

Related U.S. Application Data

(60) Provisional application No. 63/014,433, filed on Apr. 23, 2020.

(51) Int. Cl.
*B64C 9/02* (2006.01)
*B64C 9/16* (2006.01)
(Continued)

(52) U.S. Cl.
CPC ............... *B64C 13/40* (2013.01); *B64C 9/02* (2013.01); *B64C 9/16* (2013.01); *B64C 9/18* (2013.01); *B64C 21/04* (2013.01); *B64D 41/00* (2013.01)

(58) Field of Classification Search
CPC .... B64C 9/16; B64C 9/18; B64C 9/30; B64C 21/02; B64C 21/04; B64C 21/08
See application file for complete search history.

(56) References Cited

U.S. PATENT DOCUMENTS 8,382,043 B1 * 2/2013 Raghu .................... F15D 1/008
244/1 N
2016/0272301 A1 * 9/2016 Shmilovich ............ B64C 21/08
(Continued)

FOREIGN PATENT DOCUMENTS

EP 2955105 A1 * 12/2015 ............. B64C 21/04

OTHER PUBLICATIONS

Hartwich, P. M. et al., "AFC-Enabled Simplified High-Lift System Integration Study," NASA Technical Publication, Sep. 2014, pp. 1-39.
(Continued)

*Primary Examiner* — Timothy D Collins
*Assistant Examiner* — Justin Michael Heston
(74) *Attorney, Agent, or Firm* — Robin W. Edwards; Trenton J. Roche (57) ABSTRACT

A simple-hinged flap assembly for a winged aircraft includes a simple-hinged flap having a leading airfoil section pivotably connected to a trailing airfoil section via a hinge, and an active flow control (AFC) actuator assembly. The assembly is connected to or integrally formed with the flap and includes upstream and downstream AFC actuators arranged in respective first and second rows, and collectively configured to provide first and second outlet mass flowrates. The downstream AFC actuators emit the second outlet mass flowrate at a rate that substantially exceeds the first outlet mass flowrate, such that the first outlet mass flowrate preconditions a boundary layer around the simple-hinged flap assembly. A winged aircraft includes a pneumatic power
(Continued)

supply, fuselage, a wing connected to the fuselage, and the simple-hinged flap assembly.

20 Claims, 7 Drawing Sheets

(51) Int. Cl.
*B64C 9/18* (2006.01)
*B64C 21/04* (2023.01)
*B64C 13/40* (2006.01)
*B64D 41/00* (2006.01)

(56) References Cited

U.S. PATENT DOCUMENTS

| | | | |
|---|---|---|---|
| 2016/0280358 A1* | 9/2016 | Lin | B64C 23/06 |
| 2017/0297680 A1* | 10/2017 | Shmilovich | F15B 21/042 |
| 2018/0043995 A1* | 2/2018 | Shmilovich | B64C 21/02 |
| 2019/0248475 A1* | 8/2019 | Shmilovich | G05D 7/0664 |
| 2020/0017199 A1* | 1/2020 | Leung | F15D 1/008 |

OTHER PUBLICATIONS

Smith, A.M.O., "High-Lift Aerodynamics," J. Aircraft, 37th Wright Brothers Lecture, Jun. 1975, pp. 501-530, vol. 12, No. 6.
Lin, John C. et al., "Parametric Investigation of a High-Lift Airfoil at High Reynolds Numbers," Journal of Aircraft, Jul.-Aug. 1997, pp. 485-491, vol. 34, No. 4.
Melton, Latunia Pack et al., "High-Lift System for a Supercritical Airfoil: Simplified by Active Flow Control," AIAA 2007-707, 45th AIAA Aerospace Sciences Meeting and Exhibit, Jan. 8-11, 2007, pp. 1-20, Reno, NV.
Lin, John C. et al., "High Lift Common Research Model for Wind Tunnel Testing: An Active Flow Control Perspective," AIAA 2017-0319, AIAA SciTech Forum, 55th AIAA Aerospace Sciences Meeting, Jan. 9-13, 2017, pp. 1-15, Grapevine, TX.
Vatsa, Veer N. et al., "Comparative Study of Active Flow Control Strategies for Lift Enhancement of a Simplified High-Lift Configuration," AIAA 2019-3724, AIAA Aviation 2019 Forum, Jun. 17-21, 2019, pp. 1-28.
Milholen, William E. et al., "Enhancements to the FAST-MAC Circulation Control Model and Recent High-Reynolds Number Testing in the National Transonic Facility," AIAA 2013-2794, 31st AIAA Applied Aerodynamics Conference, Jun. 24-27, 2013, pp. 1-25, San Diego, CA.
Y. El Sayed, M. et al., "Open Loop Control on a Coanda Flap Water Tunnel Model," AIAA 2017-3247, AIAA Aviation Forum, 35th AIAA Applied Aerodynamics Conference, Jun. 5-9, 2017, pp. 1-9, Denver, CO.
Koklu, Mehti, "The Effects of Sweeping Jet Actuator Parameters on Flow Separation Control," AIAA 2015-2485, AIAA Aviation Forum, 45th AIAA Fluid Dynamics Conference, Jun. 22-26, 2015, pp. 1-19, Dallas, TX.
Andino, Marlyn Y. et al., "Flow Separation Control on a Full-Scale Vertical Tail Model using Sweeping Jet Actuators," AIAA 2015-0785, AIAA SciTech Forum, 53rd AIAA Aerospace Sciences Meeting, Jan. 5-9, 2015, pp. 1-14, Kissimmee, FL.
Whalen, Edward A. et al., "Flight Test of an AFC Enhanced Vertical Tail," AIAA Journal, vol. 56, No. 9, 2018, pp. 3393-3398.
Desalvo, Michael et al., "High-Lift Enhancement using Fluidic Actuation," AIAA 2010-0863, 48th AiAA Aerospace Sciences Meeting, Jan. 4-7, 2010, pp. 1-17, Orlando, FL.
Desalvo, Michael et al., "Enhancement of a High-Lift Airfoil using Low-Power Fluidic Actuators," AIAA 2010-4248, 5th Flow Control Conference, Jun. 28-Jul. 1, 2010, pp. 1-15, Chicago, IL.
Gad-El-Hak, Mohamed, "Modern Developments in Flow Control," Applied Mechanics Reviews, Jul. 1996, pp. 365-379, vol. 49, No. 7, American Society of Mechanical Engineers.
Lin, et al., "Wind Tunnel Testing of High Efficiency Low Power (HELP) Actuation for Active Flow Control", AIAA SciTech Forum, Jan. 6-10, 2020, p. 1-18, Orlando, FL.
Kiedaisch, John et al., "Active Flow Control Applied to High-Lift Airfoils Utilizing Simple Flaps," AIAA 2006-2856, 3rd AIAA Flow Control Conference, Jun. 5-8, 2006, pp. 1-22, San Francisco, CA.
Whalen, Edward A. et al., "Performance Enhancement of a Full-Scale Vertical Tail Model Equipped with Active Flow Control," AIAA 2015-0784, 53rd AIAA Aerospace Sciences Meeting, Jan. 5-9, 2015, pp. 1-11.
McLean, J.D. et al., "Study of the Application of Separation Control by Unsteady Excitation to Civil Transport Aircraft," NASA-CR-1999-209338, Jun. 1999, pp. 1-64.
Hartwich, P. M. et al., "Refined AFC-Enabled High-Lift System Integration Study," NASA/CR-2016-219170, Mar. 2016, pp. 1-39.
Hartwich, P. M. et al., "System-Level Trade Studies for Transonic Transports with Active Flow Control (AFC) Enhanced High-Lift Systems," AIAA 2017-0321, AIAA SciTech 2017, Jan. 9-13, 2017, pp. 1-11, Gaylord, TX.
Greenblatt, D. et al., "The control of flow separation by periodic excitation," Progress in Aerospace Sciences, 2000, pp. 487-545, vol. 36, Issue 7.
Gad-El-Hak, M., "Flow Control," Applied Mechanics Reviews, vol. 42, No. 10, 1989, pp. 261-293.
Cattafesta III, L. N. et al., "Actuators for Active Flow Control," Annual Review of Fluid Mechanics, vol. 43, 2011, pp. 247-272.
Jones, G. S. et al., "A Sweeping Jet Application on a High Reynolds Number Semispan Supercritical Wing Configuration," AIAA 2017-3044, 35th AIAA Applied Aerodynamics Conference, Jun. 5-9, 2017, pp. 1-31, Denver, CO.
Melton, L. P. et al., "Sweeping Jet Optimization Studies," AIAA 2016-4233, 8th AIAA Flow Control Conference, Jun. 13-17, 2016, pp. 1-15, Washington, D.C.
Whalen, E. A. et al., "Full-scale Flight Demonstration of an Active Flow Control Enhanced Vertical Tail," AIAA 2016-3927, 8th AIAA Flow Control Conference, Jun. 13-17, 2016, pp. 1-9, Washington, D.C.
Vatsa, Veer N. et al., "Numerical Simulation of a Simplified High-Lift CRM Configuration Embedded with Fluidic Actuators," AIAA 2018-3063, 2018 Applied Aerodynamics Conference, Jun. 25-29, 2018, pp. 1-23, Atlanta, GA.
Shmilovich, A. et al., "Development of an Active Flow Control Technique for an Airplane High-Lift Configuration," AIAA 2017-0322, AIAA SciTech 2017, Jan. 9-13, 2017, pp. 1-23, Gaylord, TX.

* cited by examiner

HIGH EFFICIENCY LOW POWER (HELP) ACTIVE FLOW CONTROL METHODOLOGY FOR SIMPLE-HINGED FLAP HIGH-LIFT SYSTEMS

CROSS-REFERENCE TO RELATED PATENT APPLICATION(S)

This patent application claims the benefit of and priority to U.S. Provisional Patent Application Ser. No. 63/014,433, filed on Apr. 23, 2020, the contents of which are hereby incorporated by reference in their entirety.

ORIGIN OF THE INVENTION

The invention described herein was made by employees of the United States Government and may be manufactured and used by or for the Government of the United States of America for governmental purposes without the payment of any royalties thereon or therefore.

TECHNICAL FIELD

The present disclosure generally relates to wing flap systems for use aboard a winged aircraft. In particular, the present disclosure relates to active flow control (AFC)-assisted operation of a pivotable plain/simple-hinged flap system for the purpose of improving aerodynamic lift capabilities of a winged aircraft, particularly of fixed-wing transport or passenger airplanes, as well as to related methods for constructing and using such AFC-assisted flap systems.

BACKGROUND

Modern winged aircraft are equipped with a host of primary and secondary flight control surfaces and associated electromechanical and fluidic control systems. For example, ailerons, elevators, and rudders of typical fixed-wing airplanes collectively serve as the primary flight control surfaces responsible for gross motion of the aircraft. In addition, aircraft are equipped with various wing flaps, spoilers, and trim systems, all of which function as secondary flight control surfaces. The secondary flight control surfaces work in concert with the primary flight control surfaces to ensure optimal aerodynamic stability and performance during all stages of flight.

The wing flaps in particular are typically arranged at or along the trailing edges of the wings and other possible locations, and deployed in flight as needed to help control lift and aerodynamic drag. Airplane flaps are available in a wide range of configurations, ranging from simple-hinged flaps having a trailing airfoil section that pivots up or down via a hinge as needed relative to an upstream airfoil section, to more complex configurations such as the Fowler flap commonly employed on large transport and passenger airplanes. Other flap types include double-slotted Fowler flaps and split flaps, any of which may be encountered on winged aircraft of different sizes and wing configurations. The purposeful arrangement and control of such wing flaps enables a pilot to achieve a desired flight control response.

Of the various exemplary commercially-available wing flaps noted above, the simple-hinged flap in particular has the noted advantage of providing intrinsic design simplicity and operating efficiency. However, simple-hinged flaps tend to provide limited lift capabilities relative to the Fowler flap and competing flap configurations. Moreover, to achieve a lift capability comparable to that of the Fowler flap, a simple-hinged flap requires relatively high flap deflections, potentially well in excess of 40°. Modern transport aircraft and other large fixed-wing airplanes having transonic cruise speeds therefore tend to use more complex high-lift flap systems such as the Fowler flap for takeoff and landing operations.

High-lift flap systems are typically slotted on the wing's leading and trailing edges to take full advantage of beneficial aerodynamic properties of slotted airflows when achieving the requisite lift. However, slotted trailing edge devices and the associated subsystems necessary for changing a wing configuration when transitioning from cruise to low-speed flight are highly complex. Additionally, such flap systems tend to protrude externally under the wing surfaces and require external fairings, all of which can result in increased cruise drag, part count, operating complexity, and fuel consumption.

SUMMARY

Active flow control (AFC)-based lift enhancement solutions as set forth below are intended to help mitigate the above-described issues commonly associated with conventional high-lift slotted flap systems. In particular, the disclosed solutions incorporate multiple rows of upstream and downstream AFC actuators into the construction of a simple-hinged flap aboard a winged aircraft, with the rows, e.g., two or more rows, being positioned upstream and downstream relative to an external airflow direction. In this manner, the modified simple-hinged flap system is able to provide necessary high-lift performance enhancement during takeoff and landing operations, with reduced aerodynamic drag and accompanying fuel reduction during cruise conditions compared to conventional high-lift systems.

In a particular embodiment described in detail below, a simple-hinged flap assembly for use with a winged aircraft includes a simple-hinged flap and one or more AFC actuator assemblies. The simple-hinged flap as modified herein may include a leading airfoil section that is pivotably connected to a trailing airfoil section, e.g., via one or more controllable hinges. Each AFC actuator assembly is integrally formed with or connected to the structure of the simple-hinged flap. In some embodiments, a pneumatic power supply aboard the aircraft furnishes an inlet mass flowrate of air or another suitable fluid to the AFC actuator assembly.

Each AFC actuator assembly includes an upstream array of AFC actuators ("upstream AFC actuators"), e.g., sweeping jets or other suitable fluidic oscillators, or electrically powered actuators in different example constructions, with the upstream AFC actuators arranged in a first row. The upstream AFC actuators are collectively configured to provide a first outlet mass flowrate. The AFC actuator assembly also includes a downstream array of AFC actuators ("downstream AFC actuators"), e.g., discrete steady-blowing jet nozzles, with "downstream" referring to the relative position of the downstream AFC actuators with respect to an outer flow direction relative to the flap. The downstream AFC actuators are spaced a distance apart from the upstream AFC actuators and arranged in a second row.

The downstream AFC actuators of the present disclosure are collectively configured to provide a second outlet mass flowrate that substantially exceeds the first outlet mass flowrate. This mass flowrate discrepancy enables the upstream AFC actuators to effectively precondition a boundary layer around the simple-hinged flap when the winged aircraft is in flight.

Non-limiting exemplary relative positioning of the rows may include, with the leading and trailing airfoil sections generally arranged in an upstream tangent plane and a downstream tangent plane, respectively, situating the upstream AFC actuators in the upstream tangent plane and the downstream AFC actuators in the downstream tangent plane, i.e., along a tangent line as the flap is viewed from the side.

While integration of the upstream and downstream AFC actuators with the structure of the simple-hinged flap is desirable, embodiments may be realized in which the AFC actuator assembly is separately constructed and then attached to the flap, e.g., as one or more AFC actuator cartridges. An exemplary construction along these lines may include an actuator housing, e.g., a 3D-printed construction formed via additive manufacturing from aerospace-grade alloys or other suitable materials, defining therein the upstream and downstream AFC actuators. The actuator housing may define therein or include a pneumatic feed tube that is connectable to the pneumatic power supply, with the housing defining a plenum chamber. The plenum chamber is in fluid communication with the pneumatic power supply via the pneumatic feed tube in this illustrative embodiment, and with the upstream and downstream AFC actuators.

The actuator housing in a possible configuration may include a floor that is connectable to the simple-hinged flap, an end wall arranged radially or orthogonally with respect to the floor, and a curved upper wall. The curved upper wall is connected to the end wall and tapers toward a distal end of the floor, ultimately terminating at a point opposite the end wall. The curved upper wall in this representative embodiment may define the upstream AFC actuators, while the floor and the curved upper wall may together define the downstream AFC actuators.

The end wall may define a single cylindrical pneumatic feed tube in some non-limiting exemplary embodiments.

Also disclosed herein is a winged aircraft having the above-mentioned pneumatic power supply, a fuselage, one or more wings connected to the fuselage, and the simple-hinged flap assembly, the latter of which is connected to the wing(s). The simple-hinged flap assembly in this particular embodiment includes a simple-hinged flap having a leading airfoil section that is pivotably connected to a trailing airfoil section, and at least one AFC actuator assembly connected to or integrally formed with the simple-hinged flap. Each AFC actuator assembly is in fluid communication with the pneumatic power supply, and includes an upstream array of fluidic oscillators arranged in a first row. The fluidic oscillators are collectively configured to receive an inlet mass flowrate from the pneumatic power supply and, in response, to emit a first outlet mass flowrate. Each AFC actuator assembly also includes a downstream array of discrete steady-blowing jet nozzles spaced a distance apart from the fluidic oscillators in a second row.

As noted above, the steady-blowing jet nozzles are collectively configured to emit a second outlet mass flowrate that substantially exceeds the first outlet mass flowrate, such that the first outlet mass flowrate effectively preconditions a boundary layer around the simple-hinged flap when the winged aircraft is in flight.

An AFC actuator assembly is also disclosed herein for use with a simple-hinged flap aboard a winged aircraft, e.g., a fixed-wing airplane. In a possible embodiment, the actuator assembly defines a plenum chamber and a pneumatic feed tube, the latter of which is configured to connect to a pneumatic power supply located aboard the aircraft. The actuator assembly defines the above-noted upstream and downstream AFC actuators, i.e., the upstream array of fluidic oscillators arranged in a first row, as well as the downstream array of steady-blowing jet nozzles spaced a distance apart from the fluidic oscillators and arranged in the second row.

These and other features, advantages, and objects of the present disclosure will be further understood and appreciated by those skilled in the art by reference to the following specification, claims, and appended drawings.

DETAILED DESCRIPTION

The present disclosure may be embodied in many different forms. Representative examples are shown in the various drawings and described in detail below, with the understanding that the described embodiments are an exemplification of the disclosed principles, and not limitations of the broad aspects of the disclosure. To that end, elements and limitations described below, but not explicitly set forth in the claims, should not be incorporated into the claims, singly or collectively, by implication, inference, or otherwise. Moreover, the drawings discussed herein may not be to scale, and are provided purely for instructional purposes. Thus, the specific and relative dimensions shown in the Figures are not to be construed as limiting.

Additionally, unless specifically disclaimed: the singular includes the plural and vice versa; the words "and" and "or" shall be both conjunctive and disjunctive; the words "any" and "all" shall both mean "any and all"; and the words "including," "containing," "comprising," "having," along with permutations thereof and similar terms, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a forward direction of travel of a vehicle.

Figure 1:
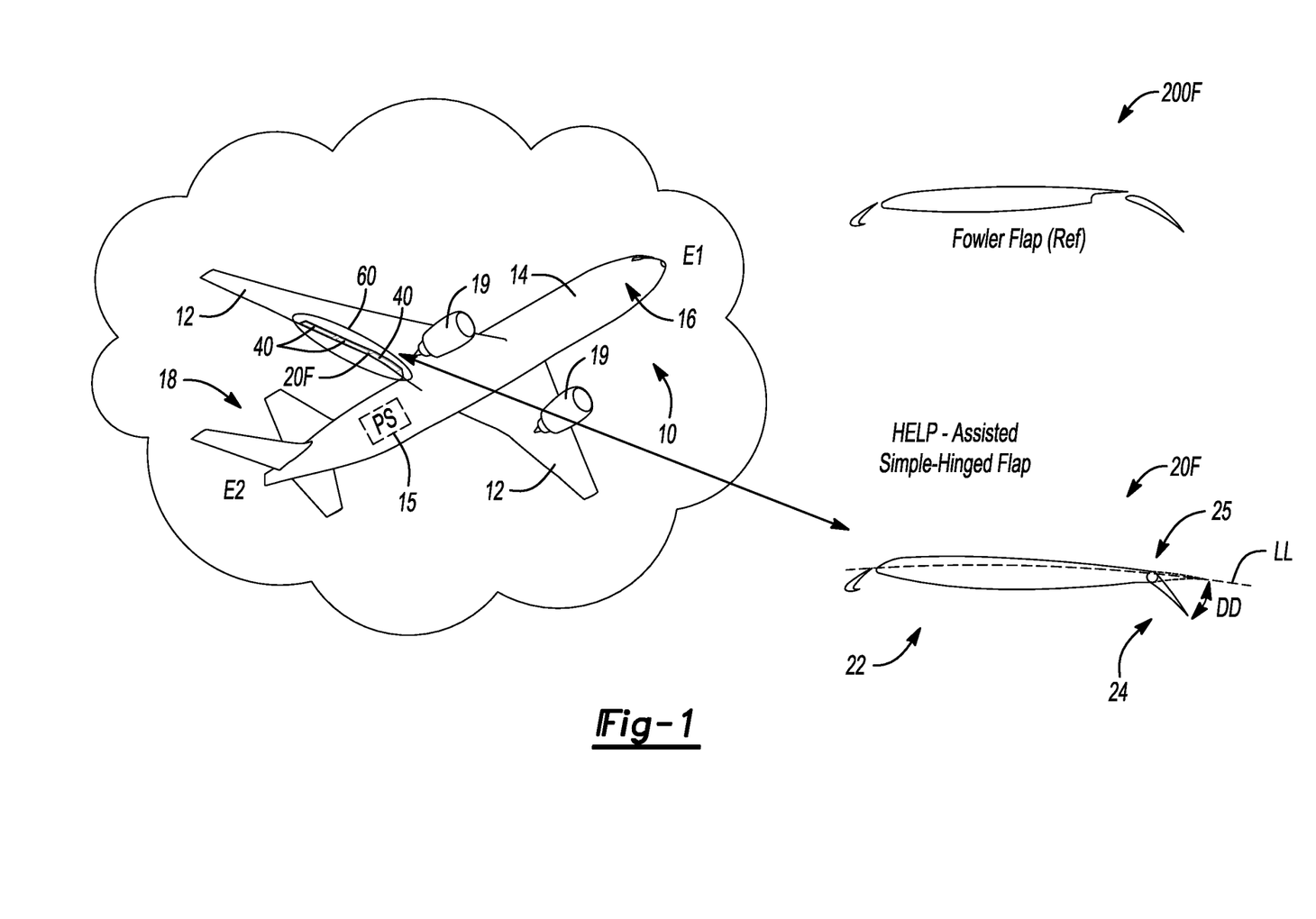
FIG. 1 is an illustration of a representative winged aircraft having an active flow control (AFC)-assisted simple-hinged flap system constructed in accordance with the present disclosure.

Referring to FIG. 1, a winged aircraft 10 is depicted in the form of an exemplary fixed-wing airplane having one or more wings 12 each extending radially from and attached to a fuselage 14. In the illustrated configuration, the aircraft 10 is embodied as a high-lift transport or passenger airplane, and thus is equipped with two or more jet engines 19 or other suitable propulsors providing application-suitable levels of thrust. A forward end E1 of the fuselage 14 terminates in a crew cabin 16, while an oppositely disposed aft end E2 of the fuselage 14 is coupled to a tail assembly/empennage 18. A pneumatic power supply (PS) 15 is located aboard the aircraft 10, possibly in the form of a compressor, engine bypass air, an auxiliary power unit, and/or another suitable reliable source of mass flow.

Within the scope of the present disclosure, each wing 12 is equipped with a simple-hinged flap assembly 60 providing a High-Efficiency Low-Power (HELP) methodology, which in turn is based on a simple-hinged flap 20F modified as set forth herein. As understood in the art, the simple-hinged flap 20F includes a leading airfoil section 22 arranged along a camber line (LL) of the simple-hinged flap 20F. A trailing airfoil section 24 is pivotably connected to the leading airfoil section 22 via a controllable hinge 25, the activation of which by an accompanying electronic and/or hydraulic signal causes the trailing airfoil section 24 to pivot downward or upward with respect to the camber line (LL), as represented in FIG. 1 by arrow DD. The simple-hinged flap 20F is HELP-assisted as described below, using active flow control (AFC) capabilities, to enable high-lift operations to be performed using a highly simplified flap construction relative to competing slotted flap configurations.

As further understood in the art, high flap deflection is needed for the simple-hinged flap 20F relative to, e.g., a conventional slotted Fowler flap and other competing flap systems, with the slotted Fowler flap shown as a reference (Ref) at 200F in FIG. 1. Relative to the camber line (LL) of the simple-hinged flap 20F, for example, deflections of 40° to 50° or more may be required. Such extreme deflection, however, tends to produce strong adverse pressure gradients, and hence massive airflow separation and an unsteady wake. Such effects can be extremely challenging to attenuate using conventional AFC-assisted methods. The disclosed HELP methodology is therefore intended to overcome such problems, which would make the modified simple-hinged flap 20F of the present disclosure available as a viable option for transport and other high-lift aircraft designers. Expected performance benefits correspond to a lift coefficient increase ($\Delta C_L$) of 0.5 or more for a typical aircraft landing configuration. Such benefits are achievable using relatively low pneumatic power from the pneumatic power supply 15 located onboard the aircraft 10. For these and other reasons, the present AFC solution is suitable for aircraft system integration.

In the art of applied fluid dynamics, the term "flow control" generally refers to the ability to manipulate a flow field to produce a desired flow state. AFC methods in particular have been proposed to enhance high-lift aerodynamic performance while reducing associated external drag. A major drawback of attempting to apply AFC steady-blowing or oscillating flow solutions to high-lift applications is the relatively high pneumatic power requirements and weight penalties of associated pneumatic systems.

In contrast, the present lift enhancement solutions are specially configured for use with the simple-hinged flap 20F and its high deflections of about 40° to 50° or more, thus enabling simplified flap construction, reduced part count, improved control efficiency, and reduced weight and fuel consumption. To achieve the required lift enhancement, the disclosed HELP concept is specifically designed to control massive separation of the boundary layer, i.e., the region of flow in close proximity to the surface of the wing 12 and its connected simple-hinged flap 20F as shown in FIG. 1. Such flow separation results from the strong adverse pressure gradients such as those encountered on highly-deflected simple-hinged flaps 20F.

Figure 2:
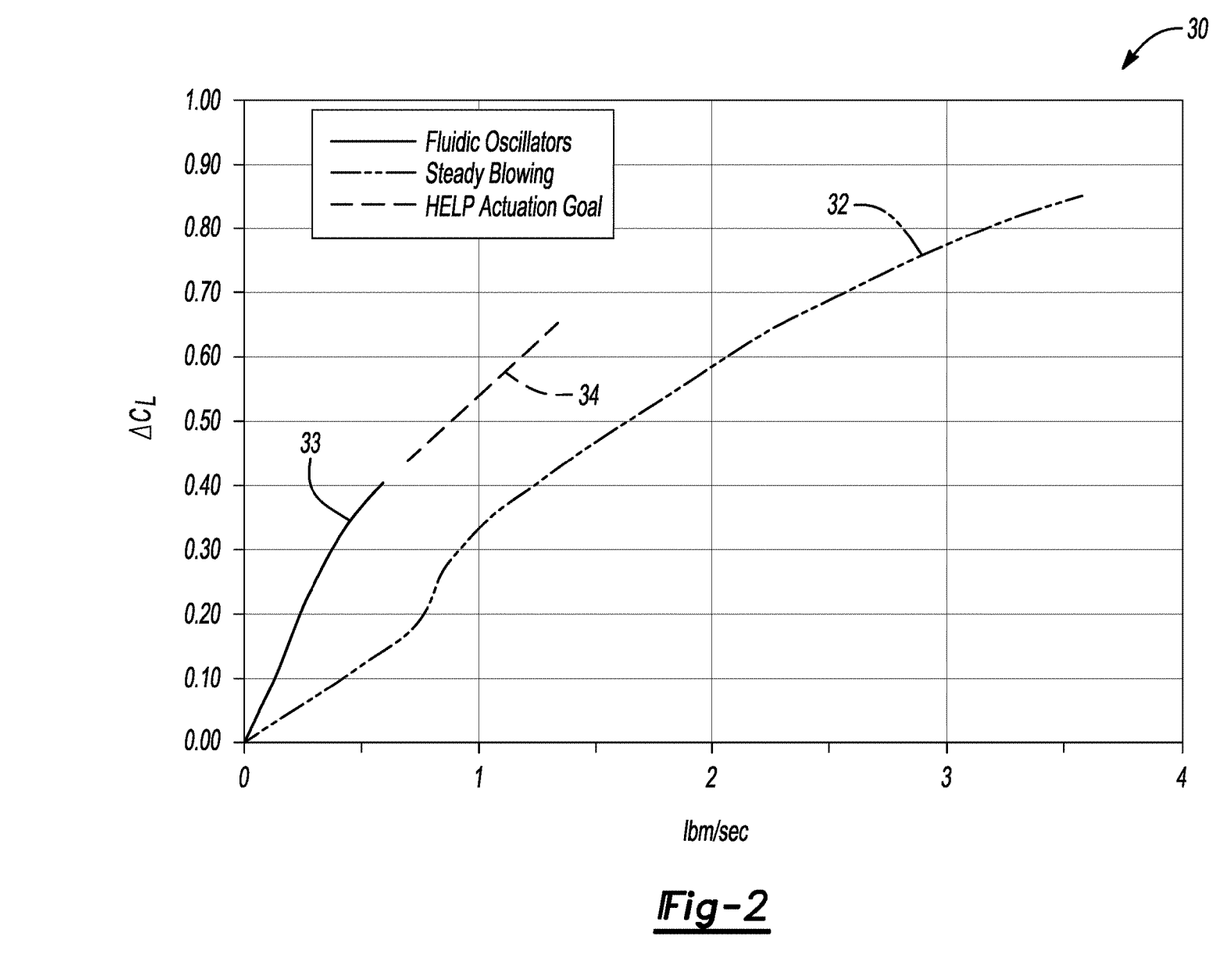
FIG. 2 is a plot of increased lift coefficient versus mass flowrate describing relative performance target for the simple-hinged flap system described herein.

Plot 30 of FIG. 2 depicts a set traces 30 describing mass flowrate ($\dot{m}$) on the horizontal axis, in lbm/sec, and coefficient of lift enhancement ($\Delta C_L$) on the vertical axis. Traces 30 include a trace 32 for a representative baseline simple-hinged flap, such as the example shown at 20F in FIG. 1, with AFC assistance as indicated by trace 32 provided by a steady-blowing flow. While a coefficient of lift well in excess of 0.5 is theoretically possible with such a simple-hinged flap 20F, the mass flowrate required to achieve the desired lift remains high, and thus suboptimal. Trace 33 of FIG. 2 represents performance improvements that may be possible after equipping the same simple-hinged flap 20F with a fluidic oscillator in lieu of a steady-blowing actuator. However, such a configuration typically terminates with a coefficient of lift ($\Delta C_L$) of about 0.4 as shown.

A lift increment goal of the HELP methodology described herein is depicted via trace 34, which extends trace 33 out to at least $\Delta C_L$=0.5, as desired, and possibly well beyond. The HELP methodology accomplishes this result through the combination of (i) the simple-hinged flap 20F of FIG. 1 modified by integration with (ii) a purposeful arrangement of upstream and downstream AFC actuators of particular actuator types, as will now be described in detail with reference to the remaining Figures. Using the described HELP solutions, therefore, one may greatly expand the possible range of flow separation control.

Figure 3:
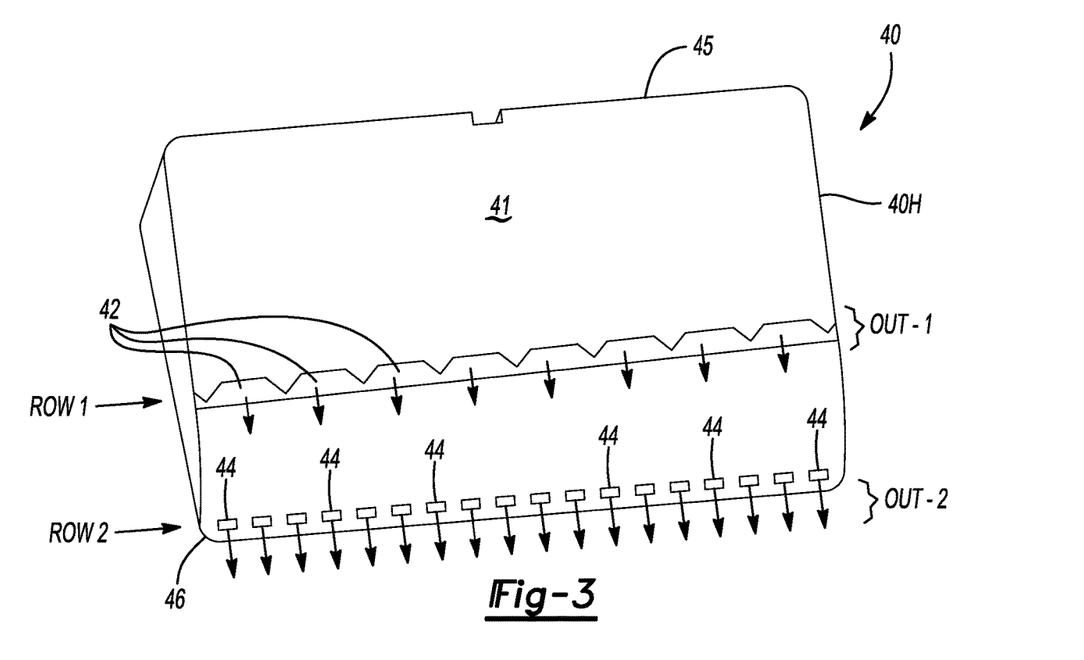
FIG. 3 is a perspective view illustration of an exemplary AFC actuator assembly usable with a simple-hinged flap system.
Figures 5, 6:
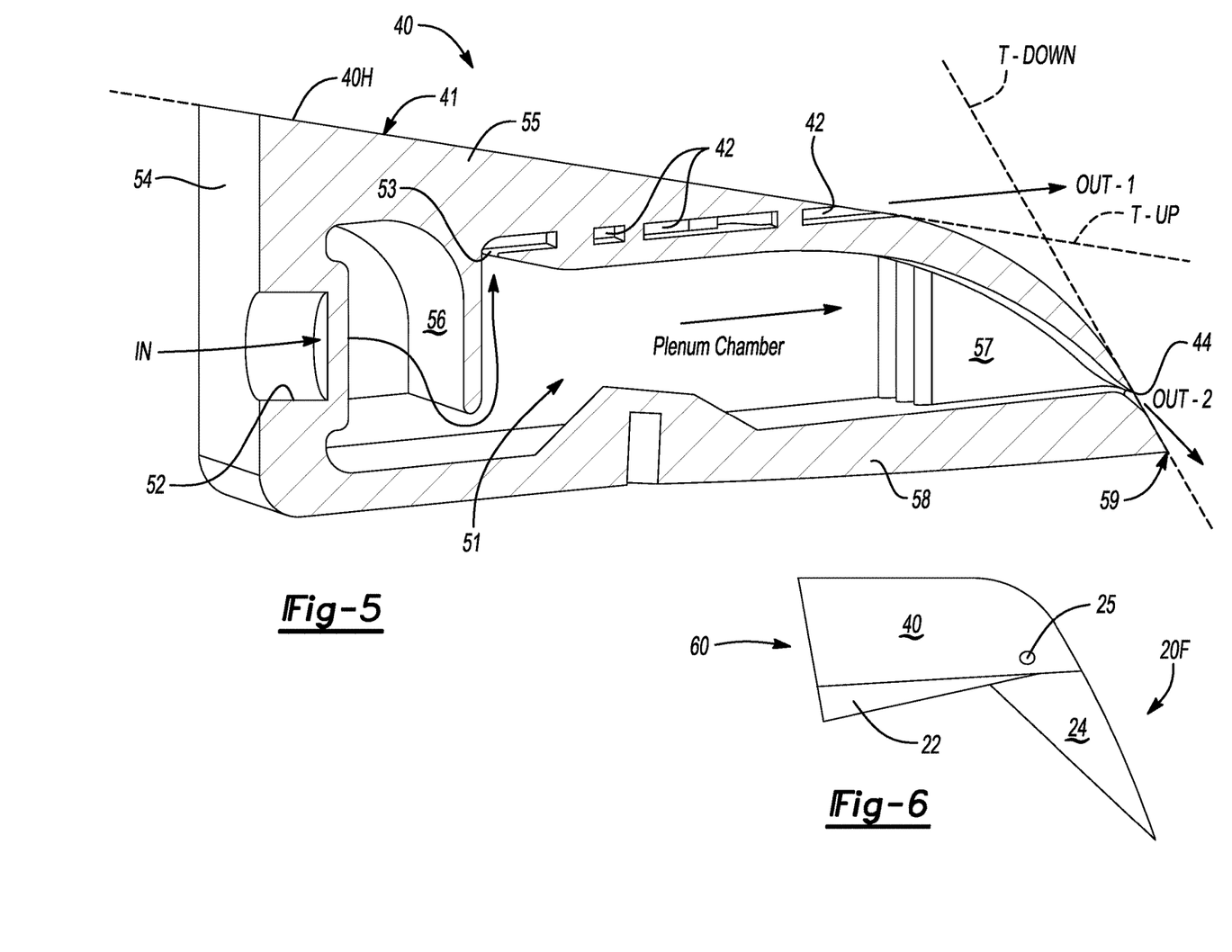
FIG. 5 is a cross-sectional side view illustration of the AFC actuator assembly shown in FIGS. 3 and 4.
FIG. 6 is a simplified side view illustration of an AFC-assisted integrated simple-hinged flap system according to an exemplary configuration.

FIG. 3 shows a possible embodiment of an AFC actuator assembly 40 that is usable with the simple-hinged flap 20F of FIG. 1 aboard the winged aircraft 10 or similar aircraft to form the simple-hinged flap assembly 60 of FIGS. 1 and 6. The AFC actuator assembly 40 may include an actuator housing 40H attached to or formed integrally with an upstream array of AFC actuators 42 ("upstream AFC actuators 42") arranged in a first row (ROW 1). The upstream AFC actuators 42 may be optionally embodied as fluidic oscillators, e.g., sweeping jets, collectively configured to receive an inlet mass flowrate as represented schematically in FIG. 5 by arrow IN, and to emit an upstream/first outlet mass flowrate (arrows OUT-1) in response thereto. Alternative actuator types exist within the scope of the disclosure with certain modifications, such as electrically-powered flow actuator, e.g., zero net mass flux actuators, plasma actuators, etc., which forego use of the inlet mass flowrate arrow IN at the upstream location, as will be appreciated by those skilled in the art, or steady-blowing actuators in another embodiment. In the various possible configurations, as the upstream array/ROW 1 is largely shielded from the ground beneath the winged aircraft 10 of FIG. 1 by the wings 12, AFC-induced noise as perceived by observers on the ground is minimized. Elimination of slotted flaps could also have the benefit of reducing levels of airframe noise.

Additionally, the AFC actuator assembly 40, or the actuator housing 40H, is attached to or formed integrally with a downstream array of AFC actuators ("downstream AFC actuators") 44 spaced a distance apart from the upstream AFC actuators 42, and arranged in a second row (ROW 2). The distance between ROW 1 and ROW 2 will be application-specific, and would depend on the size of the simple-hinged flap 20F being used, mass airflow, and other aerodynamic factors. The downstream AFC actuators 44, e.g., steady-blowing jet nozzles having generally rectangular openings with predetermined spacing as shown, are collectively configured in the illustrated embodiment to emit a second outlet mass flowrate (arrows OUT-2) that substantially exceeds the first outlet mass flowrate (OUT-1). This predetermined mass flow discrepancy helps to ensure that the first outlet mass flowrate represented by arrows OUT-1 effectively preconditions a boundary layer around the simple-hinged flap 20F of FIG. 1 when the winged aircraft 10 is in flight.

The upstream AFC actuators 42 may be variously embodied as the above-noted sweeping jets or other suitable fluidic oscillators, or as electrically-powered actuators or other suitable actuator types capable of providing sufficient boundary layer flow attachment up to ROW 2, thus enabling the downstream AFC actuators 44 to achieve effective flow separation control on flap surfaces located downstream of the downstream AFC actuators 44. Likewise, the present innovations could be used on a drooped leading edge or a simple-hinged leading edge flap with high deflection, for the purpose of leading edge stall control. While an embodiment in which the upstream AFC actuators 42 are embodied as fluidic oscillators and the downstream AFC actuators 44 are embodied as discrete steady-blowing jet nozzles may be optimal in some applications, nothing precludes the use of, e.g., steady-blowing actuators or electrically-powered actuators for implementing the upstream AFC actuators 42, or fluidic oscillators for implementing the downstream AFC actuators 44. Likewise, the respective upstream and downstream AFC actuators 42 and 44 in other configurations may be the same actuator type, e.g., steady-blowing or fluidic oscillator types, and therefore the representative embodiments of the various Figures are intended to be illustrative of the present teachings and non-limiting.

The integral or separately constructed actuator housing 40H of FIG. 3 in some embodiments may be a generally rectangular structure as shown, securely mountable to or formed integrally with the simple-hinged flap 20F. In an installed position proximate a trailing edge of such a wing 12, an upstream edge 45 of a major surface 41 of the AFC actuator assembly 40 is positioned away from a trailing edge (not shown) of the wing 12. A downstream edge 46 of the major surface 41 of the AFC actuator assembly 40 is thus positioned adjacent to such a trailing edge of the wing 12 being outfitted by the depicted assembly 40.

Figure 4:
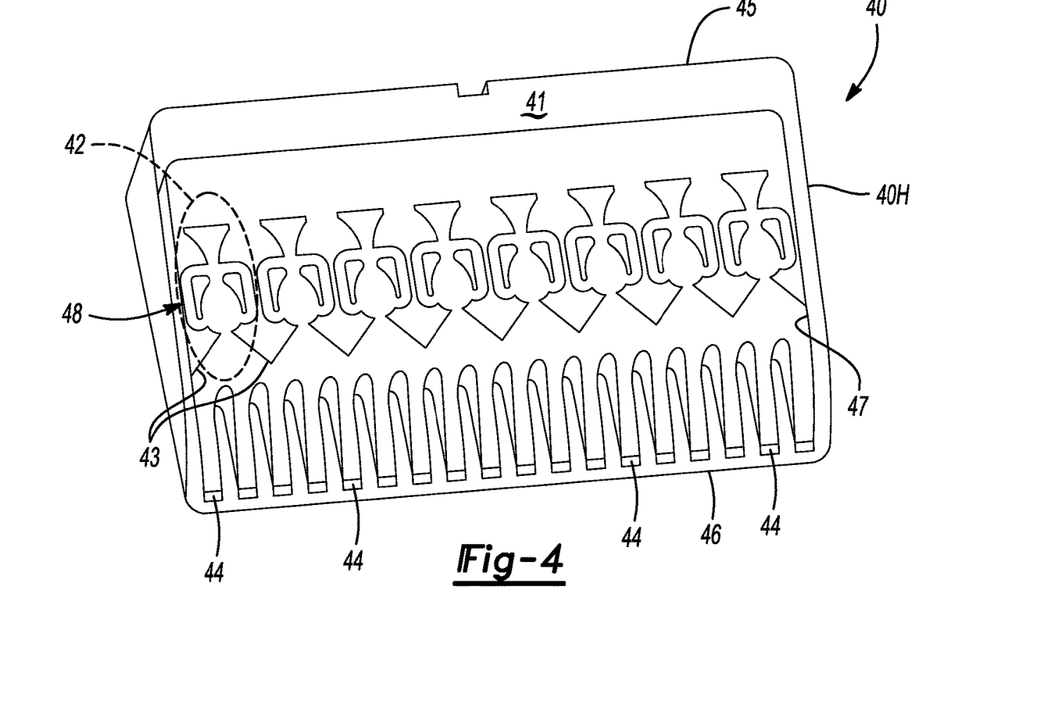
FIG. 4 is a perspective view of the AFC actuator assembly shown in FIG. 3 depicting internal construction thereof according to a representative embodiment.

Referring briefly to FIG. 4, structure of the actuator housing 40H around a perimeter 47 has been removed to depict representative internal fluid passages 48 for implementing the upstream AFC actuators 42, and also to show internal structure of the downstream AFC actuators 44, in this instance embodied as discrete steady-blowing jet nozzles. As understood in the art, sweeping jets and other types of fluidic oscillators are internally configured to emit jets of air that sweep back and forth. Such periodic motion enables the upstream AFC actuators 42 to interact with different regions of the boundary layer. The particular frequency and residence time of such motion is based on the size and shape of the upstream AFC actuators 42.

Referring to FIG. 5, in terms of manufacturing, the upstream AFC actuators 42 when configured to produce the first outlet mass flowrate (OUT-1) at an upstream location, and the downstream AFC actuators 44 producing the second mass flowrate (OUT-2) at a downstream location, both lack moving parts in a possible embodiment, and thus are essentially maintenance free as an additional benefit. Additionally, the downstream AFC actuators 44 when constructed as set forth above are expected to be much easier to fabricate and maintain, e.g., using 3D printing, relative to typical steady-blowing elongated slots. This is due largely to the presence of spanwise internal supporting walls 57 that collectively eliminate the need for printing internal supporting sacrificial structural lattice during 3D printing. In addition, the spanwise internal supporting walls 57 add structural strength, enabling the AFC actuator assembly 40 to withstand relatively high chamber pressures. The spanwise internal supporting walls 57 likewise separate the downstream AFC actuators 44 from each other so as to produce a reasonably uniform exit flow between adjacent downstream AFC actuators 44, thereby eliminating the need for additional internal features, e.g., a choke plate, to ensure exit flow uniformity.

The AFC actuator assembly 40 is shown in FIG. 5 in a cross-sectional view to depict a possible internal construction, with other constructions being possible within the scope of the present disclosure. In the illustrated embodiment, the actuator housing 40H defines therein a plenum chamber 51 and a pneumatic feed tube 52, the latter of which may be configured to connect to the pneumatic power supply 15 located aboard the winged aircraft 10 of FIG. 1. For example, the pneumatic feed tube 52 may be shaped to receive a length of pneumatic tubing, pipe, or hose that fluidly connects the AFC actuator assembly 40 to the pneumatic power supply 15 in embodiments in which the inlet mass flowrate (arrow IN) is required. The pneumatic feed tube 52 is thus configured to receive the inlet mass flowrate (arrow IN), which then passes into the defined plenum chamber 51 for distribution in the illustrated exemplary embodiment.

With respect to flow distribution, the inlet mass flowrate (arrow IN) entering the plenum chamber 51 flows through the internal flow channels 48 of the upstream AFC actuators 42 located in ROW 1 of FIG. 3, when configured as fluidic actuators and not electrically-operated actuators as noted above, through corresponding fluid inlets 53 defined by the actuator housing 40H, before being discharged as the first outlet mass flowrate (OUT-1). A vertical wall 56 located inside of the plenum chamber 51 may be used to provide flow uniformity and directs most of the mass flow to the downstream AFC actuators 44, i.e., less mass flow into the fluid inlets 53. Such a vertical wall 56 extends the entire width of the plenum chamber 51 in a three-dimensional view. At the same time, the spanwise internal supporting walls 57 divert some of the mass airflow entering the plenum chamber 51 through the above-described downstream AFC actuators 44 to provide the second outlet mass flowrate (OUT-2) downstream of the first outlet mass flowrate (OUT-1). While the relative upstream and downstream locations of the respective upstream AFC actuators 42 and the downstream AFC actuators 44 remains intact in the various embodiments, the actual locations of each with respect to the major surface 41 of the housing 40H may vary in different applications.

For example, and referring briefly to FIG. 6, a possible embodiment of the simple-hinged flap assembly 60 includes the AFC actuator assembly 40 being formed integrally with the simple-hinged flap 20F. The simple-hinged flap 20F in this embodiment includes the leading airfoil section 22 formed integrally with the AFC actuator assembly 40, and a trailing airfoil section 24 pivoting about the hinge 25 in response to a suitable control signal. When the structure of the assembly 40 is integrated into that of the simple-hinged flap 20F, e.g., via 3D printing/additive manufacturing or other suitable manufacturing methods, the leading airfoil section 22 is generally arranged in an upstream tangent plane ("T-UP"), with one line of such a plane visible from the perspective of FIG. 6.

The trailing airfoil section 24 of FIG. 6 is likewise situated in this embodiment in a downstream tangent plane ("T-DOWN"). In the FIG. 5 embodiment, which considers the possibility of the AFC actuator assembly 40 being a separate element attached to the simple-hinged flap 20F of FIG. 1 or integrally formed with the simple-hinged flap 20F, the upstream AFC actuators 42 may be situated in the upstream tangent plane (T-UP), and the downstream AFC actuators 44 may be situated in the downstream tangent plane (T-DOWN). However, other relative positions could be used in alternative embodiments, with the illustrated tangent plane orientations being one possible orientation possibly enabling optimal aerodynamic performance.

Further with respect to FIG. 5, an exemplary embodiment of the actuator housing 40H includes a floor 58 that is connectable to the simple-hinged flap 20F of FIG. 1, an end wall 54 arranged radially, e.g., orthogonally, with respect to the floor 58, and a curved upper wall 55 having the major surface 41. The curved upper wall 55, which is connected to or formed integrally with the end wall 54, tapers toward a distal end 59 of the generally planar floor 58. In the illustrated exemplary embodiment, the curved upper wall 55 defines the upstream AFC actuators 42, while the floor 58 and the curved upper wall 55, possibly along with the supporting walls 57 noted above, together define the downstream AFC actuators 44.

In the non-limiting construction of FIGS. 3-6, therefore, the AFC actuator assembly 40 is configured to enable the upstream AFC actuators 42 to emit or direct a significantly smaller amount of mass flowrate as the first outlet mass flowrate (OUT-1) than is emitted by the downstream AFC actuators 44. Although the relative mass flow difference between ROW 1 and ROW 2 of FIG. 3 may vary with the configuration of the AFC actuators 42 and 44, "significantly smaller" as used herein in this context means "less than about 25% of", i.e., a downstream-to-upstream ratio greater than about 4:1. This pronounced mass flow difference is intended to ensure adequate preconditioning of the boundary layer, such that the higher-flowing downstream AFC actuators 44 are able to achieve optimum flow control authority. Boundary-layer preconditioning in this manner also has the benefit of attenuating effects of surface curvature of the major surface 41 and the simple-hinged flap 20F, and adverse pressure gradients at the shoulder of the trailing airfoil section 24 shown in FIGS. 1 and 6.

Figure 7:
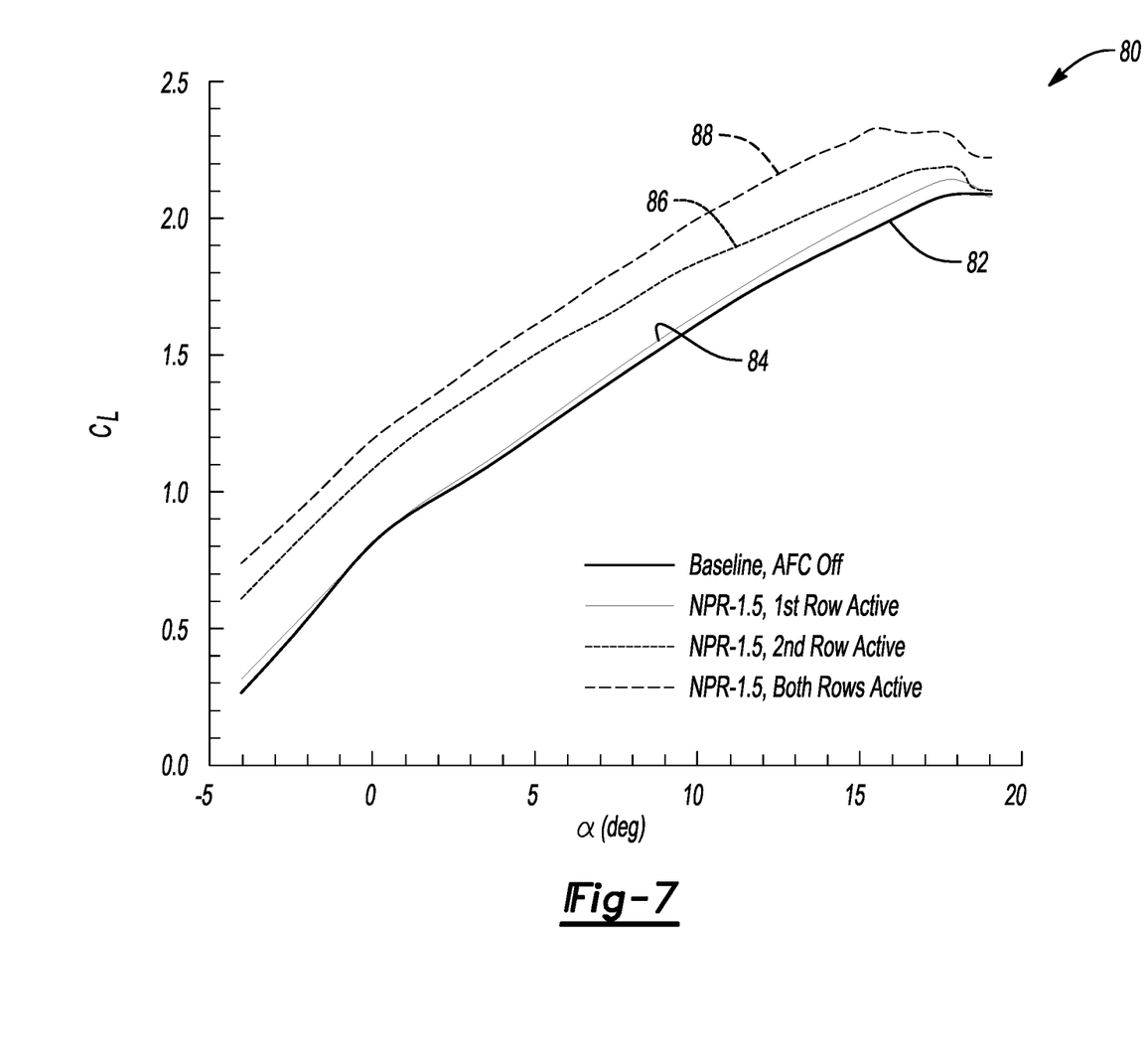
FIG. 7 is a plot of synergistic benefits of using multi-row actuation of the actuator assembly depicted in FIGS. 3 and 4.

Referring to FIG. 7, the representative embodiments of FIGS. 3-6 use two different rows of flow actuators, i.e., ROW 1 and ROW 2 of FIG. 3, to synergistically produce a total aerodynamic lift exceeding the sum of each row acting individually. Traces 80 include a baseline (i.e., AFC-off) trace 82 in which the representative simple-hinged flap 20F of FIGS. 1 and 6 is operating with the upstream AFC actuators 42 and the downstream AFC actuators 44 turned off. At an exemplary nozzle pressure ratio (NPR) of 1.5, traces 84, 86, and 88 represent lift performance in terms of coefficient of lift ($C_L$) at different angles of attack ($\alpha$), with the latter represented in degrees (deg). Optimal lift performance is enjoyed when the upstream AFC actuators 42 and the downstream AFC actuators 44 are both turned on, as indicated by trace 88. Activation of only the upstream AFC actuators 42, i.e., trace 84, has little discernable effect on lift relative to the performance represented by baseline trace 82. While exclusive use of the downstream AFC actuators 44 located in ROW 2 provides a substantial lift improvement, the trajectory of trace 88 represents the synergistic benefits of dual-row actuation within the scope of the disclosure.

Figure 8:
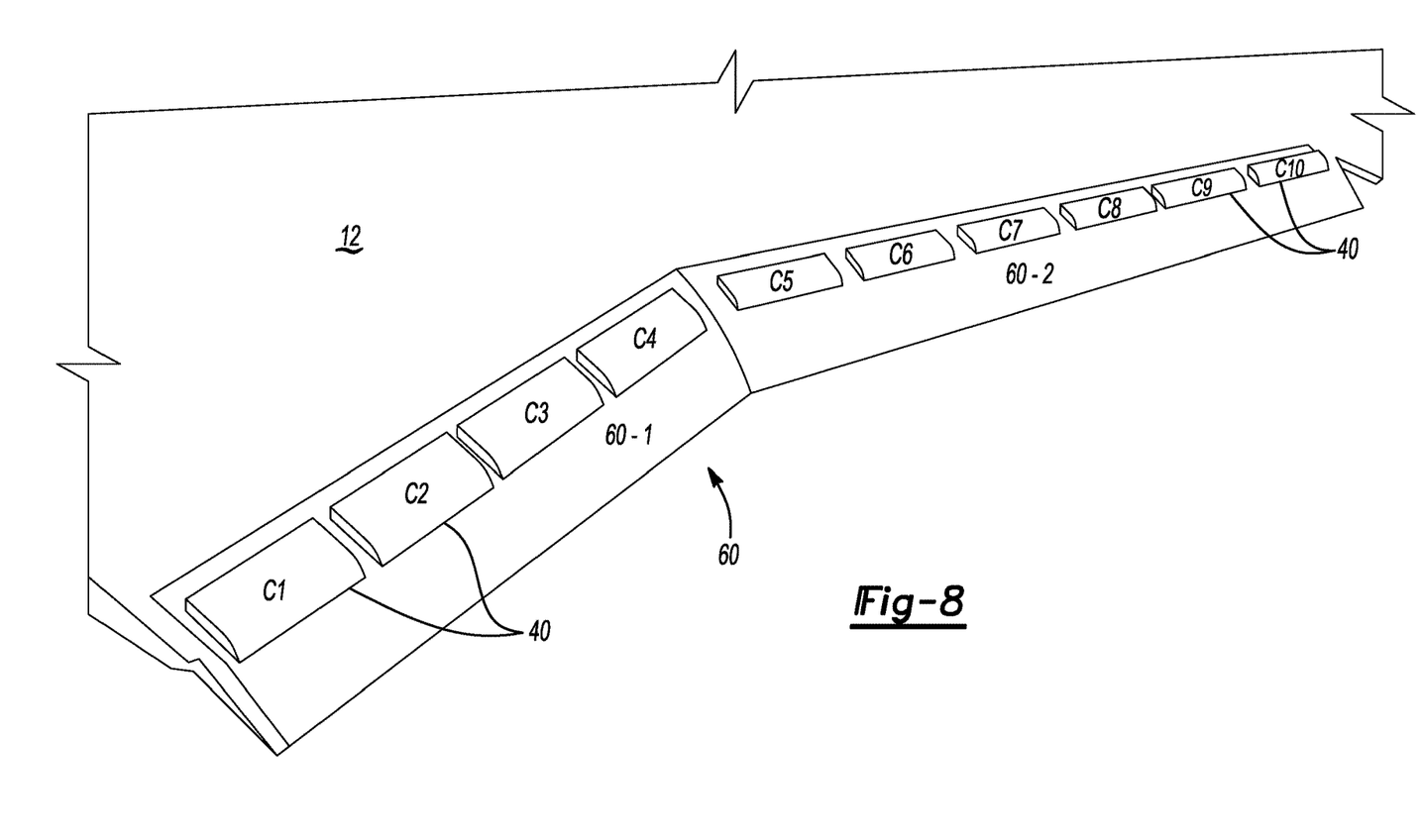
FIG. 8 is a perspective view illustration of possible inboard and outboard locations of multiple AFC actuator assemblies according to a non-limiting representative embodiment.

Referring to FIG. 8, possible implementations of the present teachings include attachment to or integral formation of at least one AFC actuator assembly 40 as described above to/with the simple-hinged flap 20F of FIG. 1. That is, a small simple-hinged flap 20F may be equipped with a single AFC actuator assembly 40, or a larger simple-hinged flap 20F may include multiple such AFC actuator assemblies 40 as needed.

For example, a larger simple-hinged flap 20F of a representative section of the wing 12 as shown may have an inboard section 60-1 and an outboard section 60-2, with the inboard section 60-1 being shorter than the outboard section 60-2 in this particular configuration. A plurality of the AFC actuator assemblies 40 may be provided on/in the inboard section 60-1 in this embodiment, with a different plurality provided on/in the outboard section 60-2. In the illustrated embodiment, four such AFC actuator assemblies 40 (C1, C2, C3, C4) are provided on the inboard section 60-1, while six AFC actuator assemblies 40 (C5, C6, C7, C8, C9, C10) are provided on the larger outboard section 60-2, with the particular number of assemblies 40 located on a given section 60-1 or 60-2 once again being application-specific. Alternatively, each of the sections 60-1 and 60-2 might be equipped with a single assembly 40, perhaps one having an elongated or suitably enlarged construction and a suitably sized pneumatic feed tube 52 (see FIG. 5).

Figure 9:
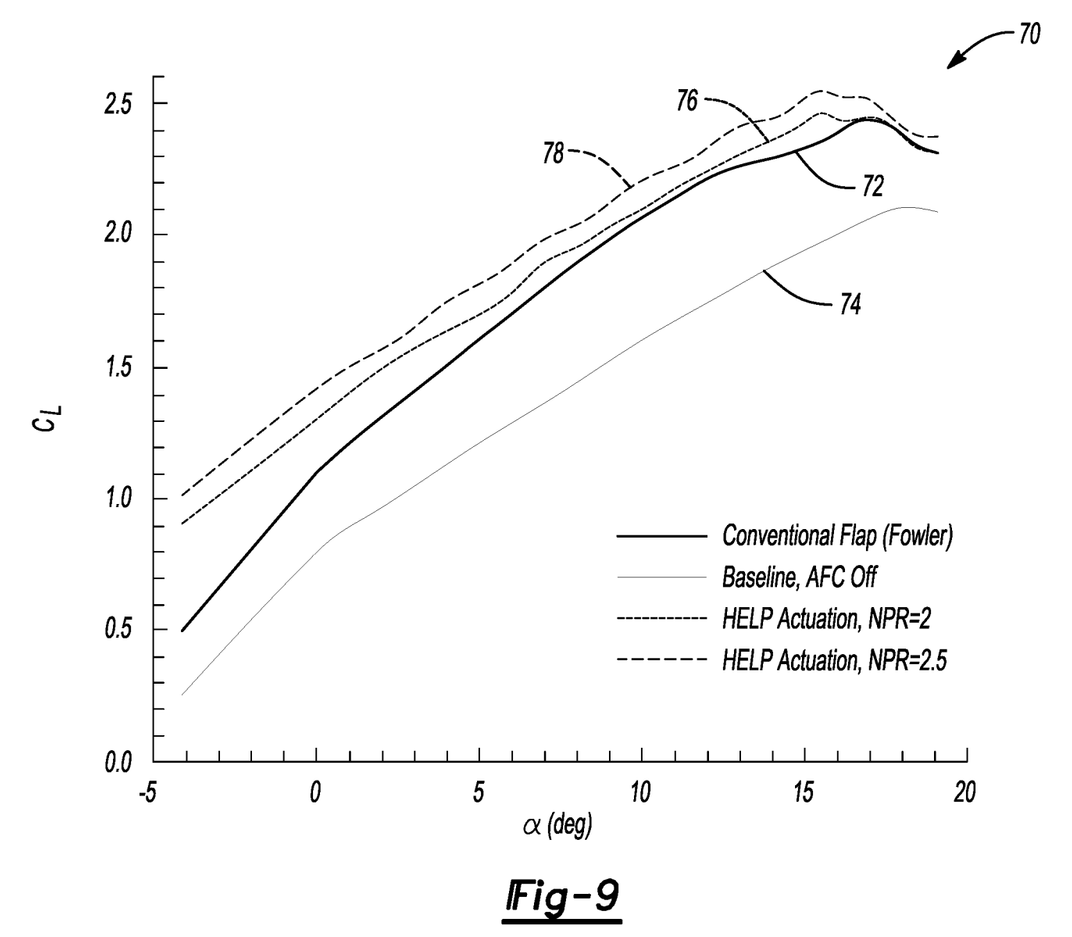
FIG. 9 is a plot comparing representative lift performance of an AFC-assisted simple-hinged flap system, constructed in accordance with the present disclosure, with that of a Fowler flap and a simple hinged-flap.

Benefits of the foregoing disclosure may be appreciated by those skilled in the art with reference to FIG. 9. Traces 70 are depicted with coefficient of lift ($C_L$) shown on the vertical axis, and angle of attack ($\alpha$) in degrees represented on the horizontal axis. Traces 70 include a depiction of lift performance of a conventional flap as trace 72, with the conventional flap in this instance being typical of the Fowler flap 200F depicted in FIG. 1. Trace 74 represents the present simple-hinged flap assembly 60 of FIGS. 1 and 6 with its provided HELP/AFC assist functions turned off. In comparison to trace 72, one skilled in the art will appreciate the lift performance limitations of the simple-hinged flap 20F, absent application of the present teachings, with the rather pronounced performance gap thus leading to industry adoption of the more complex Fowler flap 200F of FIG. 1, or other similarly complex slotted flap configurations. However, when the simple-hinged flap 20F used herein is paired with one or more of the AFC actuator assemblies 40 of FIGS. 3-6, one may realize the described aerodynamic lift performance improvements. At a representative NPR of 2, for example, trace 76 shows lift performance relative to that of the Fowler flap 200F. Increasing NPR to 2.5 further improves upon on this performance, as indicated by trace 78.

While the foregoing disclosure is described with respect to the physical structure of the AFC actuator assembly 40, those skill in the art will appreciate that the present teachings enable accompanying methods of making and methods of using the AFC actuator assembly 40. A simplified method of making the simple-hinged flap assembly 60 may include, for instance, providing the simple-hinged flap 20F described above, and then separately forming the AFC actuator assembly 40, e.g., using sintered metals, or via additive manufacturing/printing or other suitable methods. The AFC actuator assembly 40 is thereafter securely attached to the wing 12 via the simple-hinged flap 20F, such as via rivets and/or welding. Alternatively, one could integrally form the structure of FIGS. 4 and 5 with the upstream airfoil section 22 depicted in FIG. 6 using the same approach, then connecting the downstream airfoil section 24 via the hinge 35.

Likewise, a method of using the described AFC actuator assembly 40 may include, on a winged aircraft 10 equipped with the simple-hinged flap assembly 60, directing an inlet mass flow from the pneumatic power supply 15 of FIG. 1 into the AFC actuator assembly or assemblies 40. The method also includes emitting a first outlet mass flowrate (OUT-1) in response to the inlet mass airflow, via ROW 1 of upstream AFC actuators 42 as best depicted in FIG. 3. At the same time, the method includes emitting the second outlet mass flowrate (OUT-2) using the downstream AFC actuators 44, doing so in response to the inlet mass flowrate via the downstream row (ROW 2). As described above, the second outlet mass flowrate (OUT-2) substantially exceeds the first outlet mass flowrate (OUT-1), a constraint that preconditions a boundary layer around the simple-hinged flap assembly 60 when the winged aircraft 10 of FIG. 1 is in flight.

In the various embodiments described above, the upstream AFC actuators 42 and downstream AFC actuators 44 of respective ROWS 1 and 2 are both fluid actuators. As an alternative construction, one may implement the actuators of ROW1 as electrically-powered AFC actuators, such as but not limited to zero net mass flux actuators, plasma actuators, etc. Such electrically powered actuators have lower momentum output, and may be employed in some embodiments for preconditioning the boundary layer. In the case of such electrically powered AFCs when implementing the upstream AFC actuators 42, all of the mass flow goes into the downstream AFC actuators 44. This in turn will either reduce the total mass flow consumption or increase the performance for a given total mass flow input.

As will be appreciated by those skilled in the art informed by the present teachings, the present HELP methodology utilizes a purposeful combination, in a particular embodiment, of unsteady blowing fluid oscillators at an upstream location, and downstream steady-blowing actuators, such as discrete jet nozzles, to overcome strong adverse pressure gradients, while at the same time minimizing pneumatic power usage. Leveraging synergistic benefits of tandem rows, i.e., ROWS 1 and 2 of FIG. 3, ROW 1 provides an effective Coanda boost to the downstream AFC actuators 44 in ROW 2, i.e., the lift-enhancing effect of directing a thin film of air over a curved body, thereby resulting in strong flow control authority. It is expected that the provided AFC-induced $\Delta C_L$ enhancements are maintained for the entire lift curve, with the present teachings being scalable as needed to benefit a wide range of aerodynamic applications.

Aspects of the present disclosure have been described in detail with reference to the illustrated embodiments. Those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed is:

1. A simple-hinged flap assembly for a winged aircraft, comprising:
a simple-hinged flap having a leading airfoil section that is pivotably connected to a trailing airfoil section via an intervening hinge; and
an active flow control (AFC) actuator assembly connected to or integrally formed with the simple-hinged flap, the AFC actuator assembly including:
a row of preconditioning upstream AFC actuators collectively configured to provide a first outlet mass flowrate, wherein the row of preconditioning upstream AFC actuators is arranged in a spanwise direction of a wing of the winged aircraft, and the first outlet mass flowrate preconditions a boundary layer of a natural flow around the simple-hinged flap assembly before flow separation when the winged aircraft is in flight; and
a row of downstream AFC actuators spaced apart from the row of preconditioning upstream AFC actuators, wherein the row of downstream AFC actuators is arranged in a spanwise direction of the wing of the winged aircraft, and is configured to provide a second outlet mass flowrate that substantially exceeds the first outlet mass flowrate, wherein the second outlet mass flowrate controls separation of the natural flow over the wing of the winged aircraft when the winged aircraft is in flight.

2. The simple-hinged flap assembly of claim 1, wherein the winged aircraft includes a pneumatic power supply, the AFC actuator assembly is in fluid communication with the pneumatic power supply and is configured to receive an inlet mass flowrate therefrom, and the row of downstream AFC actuators is configured to provide the second outlet mass flowrate in response to the inlet mass flowrate.

3. The simple-hinged flap assembly of claim 2, wherein the AFC actuator assembly defines therein a pneumatic feed tube connectable to the pneumatic power supply, and a plenum chamber in fluid communication with each of the pneumatic feed tube, the row of preconditioning upstream AFC actuators, and the row of downstream AFC actuators.

4. The simple-hinged flap assembly of claim 3, wherein the row of preconditioning upstream AFC actuators includes fluidic oscillators.

5. The simple-hinged flap assembly of claim 3, wherein the row of downstream AFC actuators includes steady-blowing jet nozzles.

6. The simple-hinged flap assembly of claim 1, wherein the AFC actuator assembly including an actuator housing defining therein the row of preconditioning upstream AFC actuators and the row of downstream AFC actuators.

7. The simple-hinged flap assembly of claim 1, wherein the AFC actuator assembly includes a floor connectable to the simple-hinged flap, an end wall arranged radially with respect to the floor, spanwise internal supporting walls, and a curved upper wall connected to the end wall and tapering toward a distal end of the floor, wherein the curved upper wall defines the row of preconditioning upstream AFC actuators, and wherein the floor, the spanwise internal supporting walls, and the curved upper wall together define the row of downstream AFC actuators.

8. The simple-hinged flap assembly of claim 7, wherein the end wall defines a pneumatic feed tube configured to connect to a pneumatic power supply of the winged aircraft.

9. A winged aircraft comprising:
a pneumatic power supply;
a fuselage;
a wing connected to the fuselage;
an engine installed under the wing; and
a simple-hinged flap assembly connected to the wing and having:
- a simple-hinged flap having a leading airfoil section that is pivotably connected to a trailing airfoil section via an intervening hinge; and
- at least one active flow control (AFC) actuator assembly connected to or integrally formed with the simple-hinged flap, wherein the AFC actuator assembly is in fluid communication with the pneumatic power supply and receives an inlet mass flowrate therefrom, and includes:
  - a preconditioning upstream array of fluidic oscillators arranged in a first row in a spanwise direction of the wing of the winged aircraft, and collectively configured to emit a first outlet mass flowrate in response to the inlet mass flowrate, wherein the first outlet mass flowrate preconditions a boundary layer of a natural flow around the simple-hinged flap assembly before flow separation when the winged aircraft is in flight;
  - a downstream array of steady-blowing jet nozzles spaced apart from the preconditioning upstream array of fluidic oscillators and arranged in a second row, wherein the downstream array of steady-blowing jet nozzles is arranged in a spanwise direction of the wing of the winged aircraft, and is collectively configured to emit a second outlet mass flowrate that substantially exceeds the first outlet mass flowrate, the second outlet mass flowrate controls separation of the natural flow over the wing of the winged aircraft when the winged aircraft is in flight.

10. The winged aircraft of claim 9, wherein the leading airfoil section and the trailing airfoil section are arranged in an upstream tangent plane and a downstream tangent plane of the simple-hinged flap assembly, respectively, the first row is situated in the upstream tangent plane, and the second row is situated in the downstream tangent plane.

11. The winged aircraft of claim 9, wherein the at least one AFC actuator assembly includes an actuator housing defining therein the preconditioning upstream array of fluidic oscillators and the downstream array of steady-blowing jet nozzles.

12. The winged aircraft of claim 11, wherein the at least one AFC actuator assembly defines therein a pneumatic feed tube connected to the pneumatic power supply, and a plenum chamber in fluid communication with each of the pneumatic feed tube, the preconditioning upstream array of fluidic oscillators, and the downstream array of steady-blowing jet nozzles.

13. The winged aircraft of claim 12, wherein the actuator housing includes a floor connectable to the simple-hinged flap, an end wall arranged radially with respect to the floor, spanwise internal supporting walls, and a curved upper wall connected to the end wall and tapering toward a distal end of the floor, wherein the curved upper wall defines the preconditioning upstream array of fluidic oscillators therein, and wherein the floor, the spanwise internal supporting walls, and the curved upper wall together define the downstream array of steady-blowing jet nozzles.

14. The winged aircraft of claim 13, wherein the end wall defines, as the pneumatic feed tube, a single pneumatic feed tube or multiple pneumatic feed tubes that are connected to the pneumatic power supply.

15. The winged aircraft of claim 9, wherein the pneumatic power supply includes a compressor, engine bypass air, and/or an auxiliary power unit.

16. The winged aircraft of claim 9, wherein the simple-hinged flap includes an inboard section and an outboard section, the at least one AFC actuator assembly includes a first plurality of AFC actuator assemblies arranged on or within the inboard section, and a second plurality of AFC actuator assemblies arranged on or within the outboard section.

17. An active flow control (AFC) actuator assembly for a simple-hinged flap aboard an aircraft having a pneumatic power supply, the simple-hinged flap having a leading airfoil section that is pivotably connected to a trailing airfoil section via an intervening hinge, the AFC actuator assembly comprising:
- a housing defining a plenum chamber and a pneumatic feed tube configured to connect to the pneumatic power supply, thereby receiving an inlet mass flowrate from the pneumatic power supply, wherein the housing is connectable to or integrally formed with the simple-hinged flap;
- a preconditioning upstream array of fluidic oscillators arranged in a first row in a spanwise direction of a wing of a winged aircraft, and collectively configured to emit a first outlet mass flowrate in response to the inlet mass flowrate, wherein the first outlet mass flowrate preconditions a boundary layer of a natural flow around the simple-hinged flap before flow separation when the winged aircraft is in flight; and
- a downstream array of steady-blowing jet nozzles spaced apart from the preconditioning upstream array of fluidic oscillators, and arranged in a second row downstream of the first row, wherein the downstream array of steady-blowing jet nozzles is arranged in a spanwise direction of the wing of the winged aircraft, and is collectively configured to emit a second outlet mass flowrate that substantially exceeds the first outlet mass flowrate, wherein the second outlet mass flowrate controls separation of the natural flow over the wing of the winged aircraft when the winged aircraft is in flight.

18. The AFC actuator assembly of claim 17, wherein the housing defines therein the preconditioning upstream array of fluidic oscillators and the downstream array of steady-blowing jet nozzles.

19. The AFC actuator assembly of claim 17, wherein the leading airfoil section and the trailing airfoil section are arranged in an upstream tangent plane and a downstream tangent plane of the AFC actuator assembly, respectively, the first row is situated in the upstream tangent plane, and the second row is situated in the downstream tangent plane.

20. The AFC actuator assembly of claim 17, wherein the housing includes a floor connectable to the simple-hinged flap, an end wall arranged radially with respect to the floor, spanwise internal supporting walls, and a curved upper wall connected to the end wall and tapering toward a distal end of the floor, wherein the curved upper wall defines the preconditioning upstream array of fluidic oscillators therein, and wherein the floor, the spanwise internal supporting walls, and the curved upper wall together define the downstream array of steady-blowing jet nozzles.

* * * * *